(12) United States Patent
Whipple et al.

(10) Patent No.: US 8,091,839 B2
(45) Date of Patent: Jan. 10, 2012

(54) SCISSOR TYPE PIPE CLAMP

(75) Inventors: Charles E. Whipple, Collierville, TN (US); Joey D. Magno, Jr., Cordova, TN (US); Xueming Cai, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 1555 days.

(21) Appl. No.: 11/192,598

(22) Filed: Jul. 29, 2005

(65) Prior Publication Data

US 2006/0038398 A1 Feb. 23, 2006

Related U.S. Application Data

(60) Provisional application No. 60/603,834, filed on Aug. 23, 2004.

(51) Int. Cl.
*F16L 3/08* (2006.01)
(52) U.S. Cl. ........... 248/67.7; 248/73; 248/74.4; 24/279
(58) Field of Classification Search .................... 248/62, 248/67.7, 73, 74.1, 74.4; 24/279
See application file for complete search history.

(56) References Cited

U.S. PATENT DOCUMENTS

| | | | |
|---|---|---|---|
| 421,907 A | 2/1890 | Casler | |
| 1,373,673 A * | 4/1921 | Ritter | 24/279 |
| 2,069,163 A * | 1/1937 | Hibner, Jr. | 248/74.4 |
| 2,176,405 A | 10/1939 | Lombard | |
| 2,205,135 A * | 6/1940 | Eggerss | 24/279 |
| 2,368,929 A * | 2/1945 | King | 24/279 |
| 2,375,513 A | 5/1945 | Bach | |
| 2,390,750 A | 12/1945 | Tinnerman | |
| 2,561,635 A * | 7/1951 | Prochaska | 24/283 |
| 2,764,791 A | 10/1956 | Bedford, Jr. | |
| 2,846,169 A | 8/1958 | Sullivan | |
| 2,863,203 A | 12/1958 | Dalpiaz | |
| 2,863,625 A | 12/1958 | Attwood | |
| 2,891,296 A | 6/1959 | Darde | |
| 2,916,237 A * | 12/1959 | Bertling et. al. | 248/67.7 |
| 2,938,742 A | 5/1960 | Teator | |
| 2,998,217 A | 8/1961 | Englis et al. | |
| 3,066,903 A | 12/1962 | Tinnerman | |
| 3,167,286 A | 1/1965 | Sherburne | |

(Continued)

FOREIGN PATENT DOCUMENTS

CA 2005007 10/1995

(Continued)

OTHER PUBLICATIONS

"Fiberglass Strut Support Systems & Fasteners" (Pipe Clamps), Product Information from Aickinstrut, 4 pages (#34 and #18) (Publication Date Unknown).

(Continued)

*Primary Examiner* — Terrell McKinnon
*Assistant Examiner* — Bradley Duckworth
(74) *Attorney, Agent, or Firm* — Hoffmann & Baron, LLP

(57) ABSTRACT

A pipe clamp secures an elongate article such as a pipe to as structural channel. The pipe clamp includes a pair of elongate pipe straps each having one end for securement to the structural channel and an opposed end mutually interconnectable. The opposed end of one of the pipe straps is insertable into an aperture in the opposed end of the other pipe strap. A threaded fastener movably couples the ends to compressively secure the pipe strap to the structural channel about the article.

7 Claims, 3 Drawing Sheets

U.S. PATENT DOCUMENTS

| | | | |
|---|---|---|---|
| 3,185,419 A | 5/1965 | Kindorf | |
| 3,226,069 A | 12/1965 | Clarke | |
| 3,276,800 A | 10/1966 | Loudon et al. | |
| 3,310,264 A | 3/1967 | Appleton | |
| 3,317,167 A * | 5/1967 | Becker et al. | 248/73 |
| 3,370,815 A | 2/1968 | Opperthauser | |
| 3,417,951 A | 12/1968 | Rebentisch, Jr. | |
| 3,463,428 A | 8/1969 | Kindorf et al. | |
| 3,486,726 A | 12/1969 | Kindorf et al. | |
| 3,522,921 A | 8/1970 | Lytle | |
| 3,527,432 A | 9/1970 | Lytle | |
| 3,532,311 A | 10/1970 | Havener | |
| 3,547,385 A | 12/1970 | Kindorf | |
| 3,599,921 A | 8/1971 | Cumber | |
| 3,650,449 A | 3/1972 | Mundus | |
| 3,722,041 A * | 3/1973 | Munse | 24/283 |
| 4,044,428 A | 8/1977 | Kowalski | |
| 4,046,344 A | 9/1977 | Scanlan | |
| 4,059,872 A | 11/1977 | Delesandri | |
| 4,157,800 A | 6/1979 | Senter et al. | |
| 4,185,802 A | 1/1980 | Myles et al. | |
| 4,417,711 A | 11/1983 | Madej | |
| 4,479,625 A * | 10/1984 | Martz | 248/74.1 |
| 4,489,464 A * | 12/1984 | Massari et al. | 24/279 |
| 4,516,296 A | 5/1985 | Sherman | |
| 4,630,647 A * | 12/1986 | Thomson | 138/99 |
| 4,730,800 A * | 3/1988 | Engman | 248/67 |
| 4,757,965 A | 7/1988 | Allen | |
| 4,783,040 A | 11/1988 | Lindberg et al. | |
| 4,790,060 A | 12/1988 | Council et al. | |
| 4,958,419 A * | 9/1990 | Heckethorn et al. | 24/283 |
| 5,056,196 A * | 10/1991 | van Walraven | 24/279 |
| 5,141,186 A | 8/1992 | Cusic | |
| 5,163,644 A | 11/1992 | Kowalski | |
| D333,087 S | 2/1993 | Tekirian | |
| 5,216,784 A | 6/1993 | Dyer | |
| 5,234,185 A | 8/1993 | Hoffman et al. | |
| 5,274,888 A | 1/1994 | Payne | |
| 5,330,216 A | 7/1994 | Schnell | |
| 5,384,936 A * | 1/1995 | Van Walraven | 24/279 |
| 5,478,033 A | 12/1995 | Hungerford, Jr. | |
| 5,647,563 A | 7/1997 | Gantner et al. | |
| 5,653,481 A | 8/1997 | Alderman | |
| 5,697,585 A | 12/1997 | Hungerford, Jr. | |
| 5,738,386 A | 4/1998 | Barefoot et al. | |
| 5,772,258 A | 6/1998 | Dyer et al. | |
| 5,794,896 A | 8/1998 | Hungerford, Jr. | |
| 5,855,342 A | 1/1999 | Hawkins et al. | |
| 5,893,538 A | 4/1999 | Onishi et al. | |
| 5,944,365 A | 8/1999 | Kizler et al. | |
| 6,105,216 A | 8/2000 | Opperthauser | |
| 6,126,122 A | 10/2000 | Ismert | |
| 6,138,960 A | 10/2000 | Carbonare et al. | |
| 6,305,650 B1 | 10/2001 | Hawkins et al. | |
| 6,308,921 B1 | 10/2001 | Borzucki | |
| 6,431,502 B1 * | 8/2002 | Goodman | 248/74.1 |
| 6,446,915 B1 | 9/2002 | Ismert | |
| 6,494,415 B1 * | 12/2002 | Roth | 248/74.1 |
| 6,679,461 B1 | 1/2004 | Hawkins | |

FOREIGN PATENT DOCUMENTS

GB 1278732 6/1972

OTHER PUBLICATIONS

Erico Product Search, wysiwyg://20/http://www.erico.com/erico_p.../caddycfcbrkaprtoneplecestrutclmpmore.asp, (2 pages) Jul. 5, 2002.

* cited by examiner

SCISSOR TYPE PIPE CLAMP

CROSS-REFERENCE TO RELATED APPLICATIONS

This application claims priority to U.S. Provisional Application No. 60/603,834, filed Aug. 23, 2004.

FIELD OF INVENTION

The present invention relates generally to a clamp for securing elongate articles such as a pipe to a structural channel. More particularly, the present invention is directed to an improved scissor type pipe clamp which quickly and securely supports pipes to a structural chamber.

BACKGROUND OF THE INVENTION

It is well known to employ pipe clamps to secure elongate articles such as pipes, conduits and the like to structural channels. Structural channels are generally U-shaped members having upper ends including inwardly turned flanges which support thereacross pipes or other elongate articles. A pipe clamp, which is typically a two piece member, is positioned over the pipe and secured to the channel around the pipe to support the pipe to the structural member. A fastener such as a threaded bolt secures the two pieces together. Typically, pipe clamps of this type include a pair of straps which are identical. Each strap includes an attachment portion which includes hook-like feet which engage the inwardly turned flanges of the U-shaped channel, an intermediate portion for wrapping around the pipe and a connection portion extending outwardly therefrom. The connection portion extends upwardly beyond the pipe and includes an aligned apertures therethrough. The apertures accommodate a fastening member such as a threaded bolt which may be threadingly secured to tighten the straps around the pipe thereby securing the pipe to the structural channel.

One example of a pipe clamp of this type is shown in U.S. Pat. No. 3,547,385. As may be appreciated, the pipe clamp must support the pipe to the structural channel in a fashion where a load placed on the pipe will not dislodge the pipe from the structural channel.

In these types of pipe clamps, the threaded fastener serves to compress the connection ends together to force the pipe downward onto the structural channel. While this serves adequately to secure the pipe to the channel, no inward compressive force is placed on the pipe. As the connection ends above the pipes are compressed together, attachment of the pipe to the structural channel is based solely on a clamping force between the connection ends at the upper end of the pipe and the hook-like feet attached to the structural channel.

Moreover, in certain situations, a single structural channel may support a plurality of pipes in side-by-side fashion. An individual pipe clamp is used to secure each of the pipes to the structural channel. However, when the pipes are arranged in such close side-by-side fashion, it becomes difficult to access the bolt extending through the connection ends of the straps to tighten the pipe clamp. Positioning of one clamp immediately next to another clamp hinders access to the bolt making installation difficult.

In order to permit access to the bolt which tightens the straps together, the art has seen an improvement in conventional pipe clamps used in side-by-side arrangement. U.S. Pat. Nos. 4,757,965 and 5,163,644, each show pipe clamps having connection ends extending beyond the bolt. The connection ends are bent or twisted so as to be aligned at an angle with respect to the extending pipe. Additionally, U.S. Pat. No. 5,141,186 discloses a pipe clamp including straps of unequal length so that the extending connection ends are located to one side and angled to the pipe extending across the channel.

In each of the above-referenced examples, the clamp design allows for closer positioning of adjacent pipes on a structural channel. However, each of the above examples relies on compressing the connection ends together above the pipe to secure the pipe to the channel.

Furthermore, the design shown in the '965 and '644 patents requires the connection ends to be bent or twisted with respect to the extending pipe. Such bending or twisting may have tendency to reduce the strength of the pipe clamp.

In the design shown in the '186 patent, the unequal length pipe straps results in stresses being unequally applied to each of the individual strap to the clamp. This may result in the pipe being unable to support excessive loads.

It is therefore desirable to provide an improved pipe clamp which quickly and securely supports a pipe to a channel and which may be easily accessed where the pipes are arranged in close proximity.

SUMMARY OF THE INVENTION

A pipe clamp assembly is provided for securing an elongate article such as a pipe to a structural channel. The pipe clamp assembly includes a pipe clamp having a pair of pipe straps each having an attachment end for attachment to the channel, an intermediate portion for wrapping around the article and a connection end. An elongate threaded fastener is engageable with the connection ends of the straps to secure the article to the channel. One of the connection ends includes an insertion extent, the other connection end includes a receiving aperture. The insertion extent is insertable through the receiving aperture. The threaded fastener is threadedly attached to the other connection end. The threaded fastener is progressively threaded through the connection end so as to be engageable with the one connection end to spread the connection ends apart to thereby compressively secure the pipe straps about the article and to the channel.

The pipe clamp assembly of the present invention further provides a recessed stop in the other connection end for receiving the end of the threaded fastener.

Furthermore, the threaded fastener overlies the center line extending through the article perpendicular to the channel. The arrangement of connection ends positions the threaded fastener obliquely with respect to the center line.

DETAILED DESCRIPTION OF THE PREFERRED EMBODIMENTS

The present invention provides a pipe clamp which may be used to secure a pipe or other elongate article of a structural channel and wherein a plurality of pipes can be supported by a plurality of pipe clamps in close side by side proximity and where pipe clamps can be installed quickly and easily.

Figure 1:
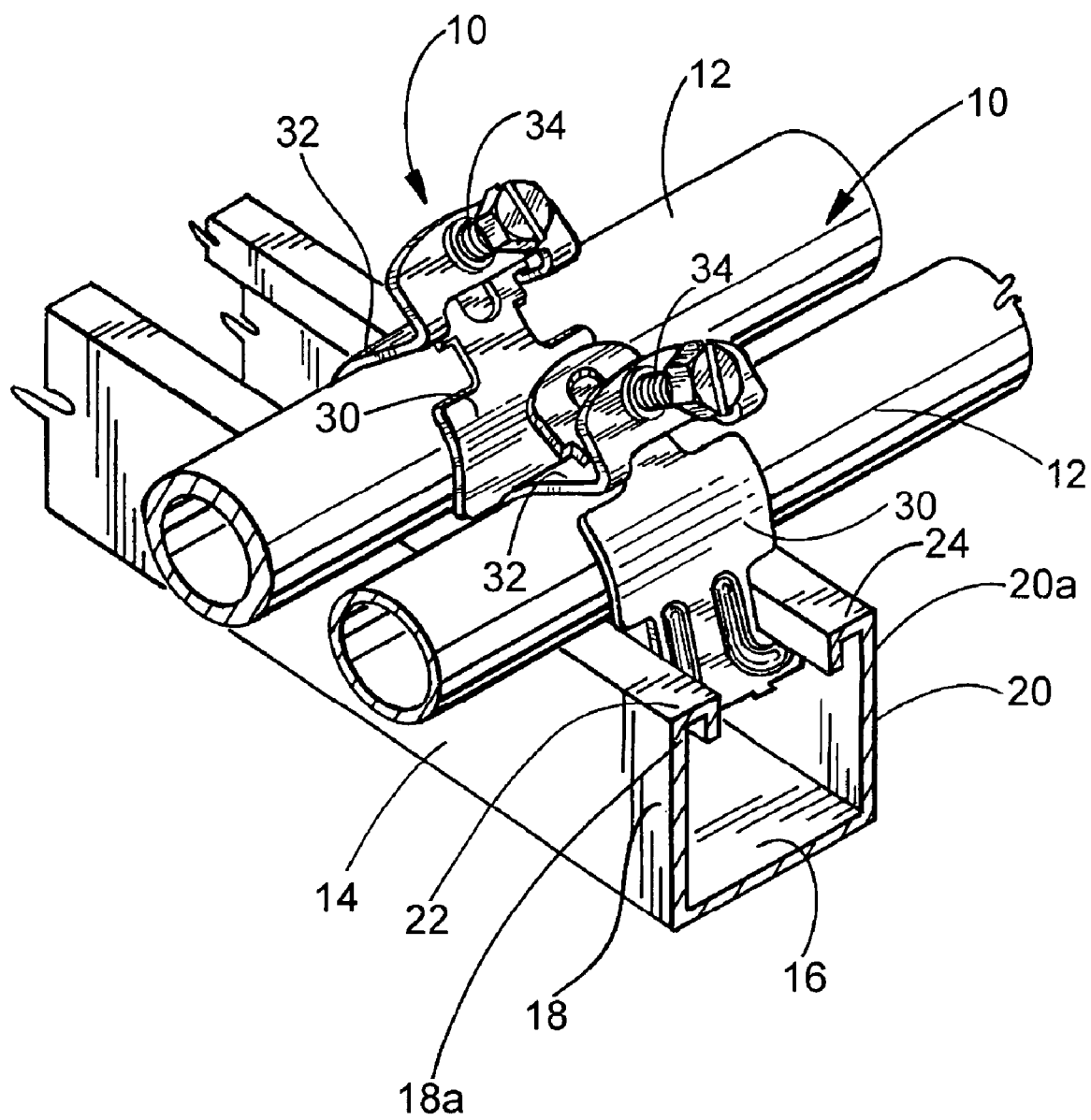
FIG. 1 is a prospective showing of the pipe clamp of the present invention shown supporting an elongate article such as pipe to a structural channel.
Figure 2:
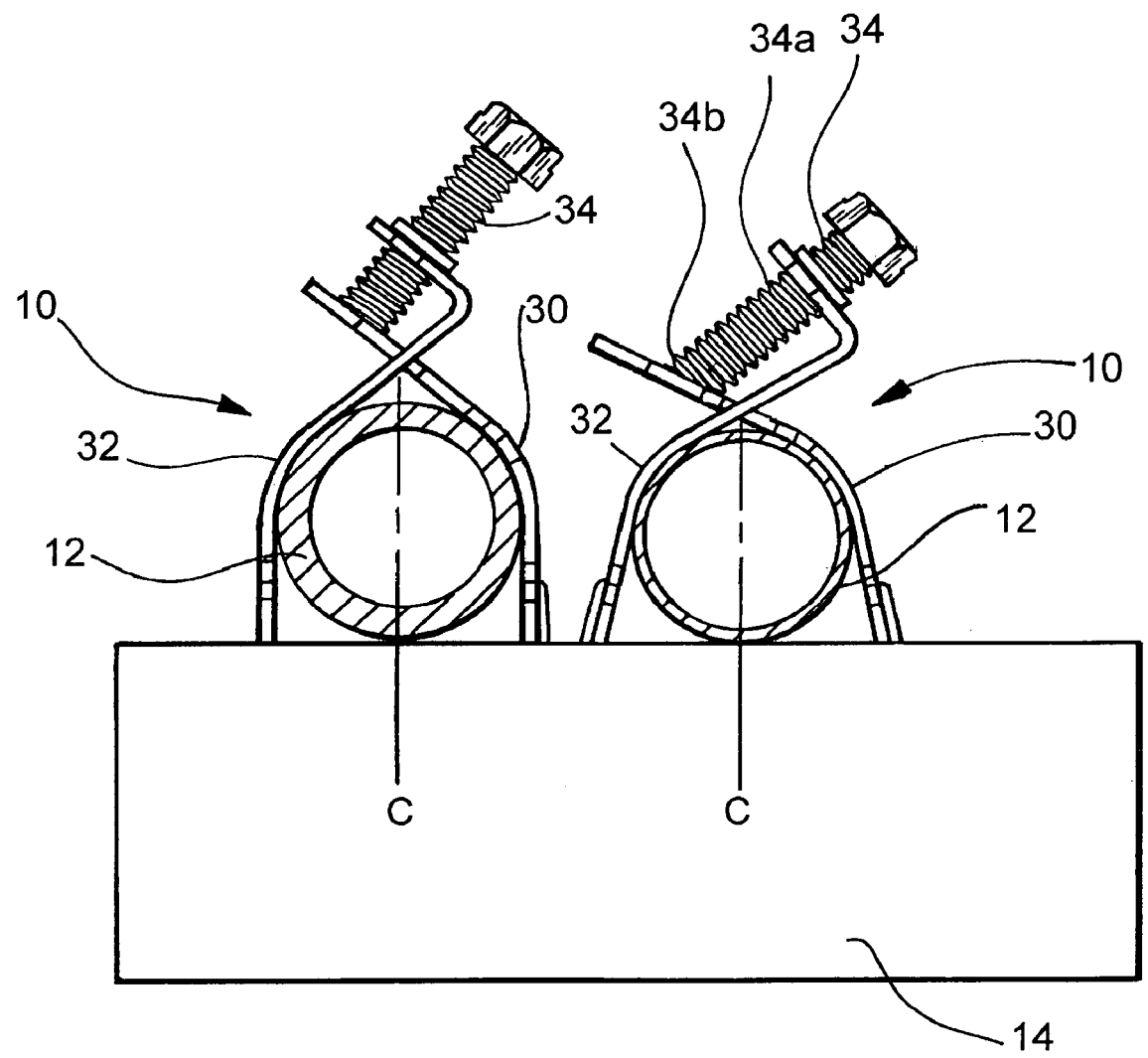
FIG. 2 is a plan view of the pipe clamps of FIG. 1.

Referring to FIGS. 1 and 2, a pair of pipe clamps 10 of the present invention are shown supporting elongated articles 12 to a structural channel 14. In the present embodiment each clamp 10 may support a pipe, conduit, cable or other elongate article to structural channel 14. For brevity, the term pipe will be used to refer to the elongate articles as shown in FIGS. 1 and 2.

Structural channel 14 is of conventional construction, having generally a u-shaped cross section defined by a bottom wall 16 and spaced apart upwardly extending side walls 18, 20. The upper extents 18 and 20 of side walls 18 and 20 include inwardly directed flanges 22 and 24, respectively.

Also as shown, one or more pipes 12 may be positioned perpendicularly across channel 14, so as to be supported on top of the inwardly turned flanges 22 and 24.

Each pipe clamp 10 of the present invention includes a pair of complimentary clamp straps 30 and 32 and a threaded bolt 34, which is used to secure the straps together around the pipe 12 as will be described in further detail hereinbelow.

Figure 3:
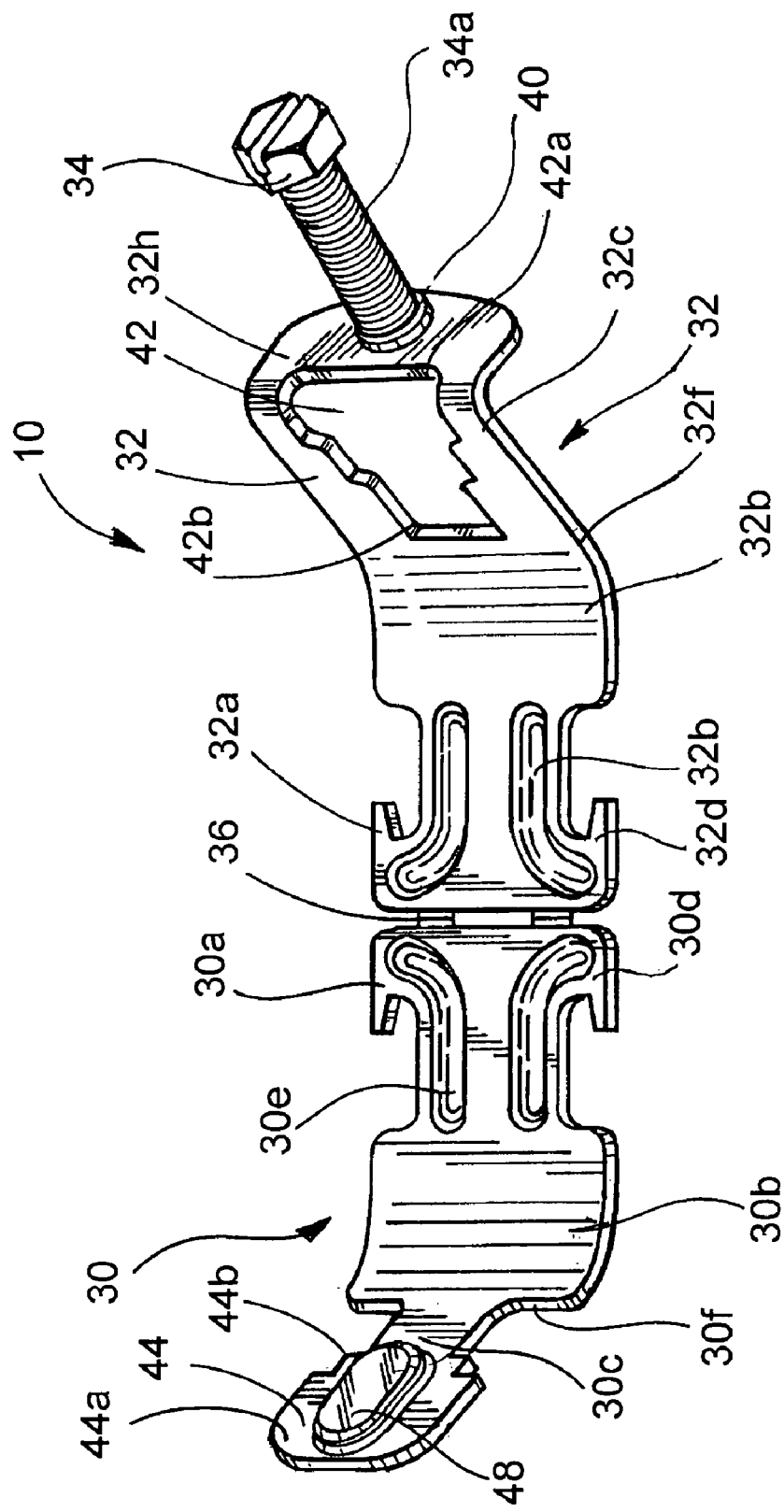
FIG. 3 is a prospective showing of the pipe clamps of the present invention, shown in its pre-installed shipping condition.

Straps 30 and 32 of pipe clamp 12 are elongate, preferably metallic members, manufactured into an integral configuration. The straps 30 and 32 are formed form a strip of metal and are stamped and conformed into the configuration shown in FIG. 3. The two clamp straps 30 and 32 are manufactured to be frangibly attached at the central location 36, which allows the straps and the attached bolt 34 to be shipped in a one piece configuration. During use, the individual straps 30 and 32 are severed from one another at the frangible location 36.

Each clamp strap 30 and 32 includes an attachment end 30a and 32a respectively, a curved intermediate portion 30b and 32b and an opposed connection end 30c and 32c. Each attachment end 30c and 32c includes a hook like foot portion 30d and 32d, which is used in conventional fashion to attach the pipe strap to the inwardly flanges 22 and 24 of channel 14. In order to provide additional strength to the attachment end, each attachment end contains a strengthening rib 30e and 32e.

Intermediate portions 30b and 32b of straps 30 and 32 are mutually inwardly curved so as to wrap around pipe 12. The curved immediate portions 30b and 32b terminate at distal locations 30f and 32f, from which point connection ends 30c and 32c extend.

Connection end 32c of clamp 32 is generally an L-shaped member having a planar surface, 32g and a mounting surface, 32h at a right angle thereto. The mounting surface 32h includes a centrally located internally threaded aperture 40 therethrough which accommodates the threaded shaft 34a of bolt 34. It is contemplated that bolt 34 is preassembled and threaded aperture 40 for shipment and use. Connection end 32c further includes an enlarged aperture 42 which extends through planar portion 32g and a portion of mounting surface 32h. Aperture 42 includes a wider upper end 42a, tapering in step-wise fashion to a narrower lower end 42b.

Clamp 30 includes an insertion extent 44 which is insertable into aperture 42 of clamp 32. Insertion extent 44 tapers from a wider portion 44a to a narrower portion 44b in step wise fashion. Insertion extent 44 is designed for insertion into aperture 42a so as to lockingly engage therewith when placed about pipe 12. Insertion extent 44 further includes a recessed stop 48 centrally located thereon. Recessed stop 48 provides a seat for end 34b of bolt 34.

Referring again to FIG. 2, the clamps 10 are shown installed over pipes 12 and attached to structural channel 14. In accordance with the present invention, the hook-like feet 30a and 32a of attachment ends 30 and 32 are engaged under the inwardly turned flanges 22 and 24 of channel 14. The clamps 30 and 32 which have been frangibly detached are then inserted around the pipe 12. The insertion extent 44 of clamp 30 is inserted into the aperture 42 of clamp 32. Bolt 34 which is threadedly secured in aperture 40 is progressed inwardly so that it abuts stop 48. Continued progression of threaded bolt 34 causes the connection extents 30c and 32c of straps 30 and 32 to be spread apart. As the clamps 30 and 32 are arranged in a scissor type construction, such spreading apart of the connection ends causes the curved intermediate extents of straps to be compressively engaged about pipe 12.

It is contemplated that with the design of the present invention, not only does the pipe clamp secure the pipe to the channel 14 by urging the pipe downwardly onto the channel but the inward compression of curved portions 30b and 32b of clamp 30 and 32 compressively secure the pipe straps about the pipe.

Moreover, the arrangement of the connection ends 30c and 32c of clamps 30 and 32 assure that the bolt 34 centrally located over the pipe so as to intersect a center line C extending perpendicularly through the pipe and channel 14. Thus, the pipe straps 30 and 32 serve to equally distribute the load between the two pipe straps enabling the clamp to support a greater load on the pipe. Still further, the bolt 34 is aligned obliquely with respect to the center line C, so that the bolt 34 can be accessed even where plural clamps are arranged in close side-by-side fashion.

Various changes to the foregoing described and shown structures will now be evident to those skilled in the art. Accordingly, the particularly disclosed scope of the invention is set forth in the following claims.

What is claimed is:

1. A pipe clamp assembly for securing an elongate article to an elongate structure channel comprising:
   a pipe clamp including a pair of pipe straps each strap having an attachment end for attachment to said channel an intermediate portion for wrapping around said article and a connection end; and
   an elongate threaded fastener in engagement with said connection ends of said straps to secure said article to said channel;
   one of said connection ends including an insertion extent and the other connection end including a receiving aperture, said insertion extent being inserted into the receiving aperture;
   said threaded fastener being threadedly attached to said other connection end and being progressively threadable therethrough to engage said insertion extent to spread said connection ends apart to thereby compressively secure said pipe straps about said article.

2. A pipe clamp assembly of claim 1 wherein said insertion extent includes a recessed stop engaging the end of said threaded fastener.

3. A pipe clamp assembly of claim 1 wherein said threaded fastener overlies a centerline extending through said pipe clamp.

4. A pipe clamp assembly of claim 3 wherein said threaded fastener is aligned obliquely with respect to said centerline.

5. A pipe clamp assembly of claim 4 wherein said other connection end includes a threaded aperture accommodating said threaded fastener.

6. A pipe clamp assembly of claim 5 wherein said threaded aperture is positioned adjacent said receiving aperture.

7. A pipe clamp assembly of claim 1 wherein said pipe straps are integrally formed and are frangibly separable.

* * * * *